US006117504A

United States Patent [19]

Yoshikawa

[11] Patent Number: 6,117,504
[45] Date of Patent: Sep. 12, 2000

[54] THREE DIMENSIONAL STAINED GLASS ARTICLE AND METHOD FOR PRODUCING THE SAME

[76] Inventor: Kazuhide Yoshikawa, 28-37, Meguri 1-chome, Hirakata-shi, Osaka-fu, Japan

[21] Appl. No.: 08/985,154

[22] Filed: Dec. 11, 1997

[30] Foreign Application Priority Data

| | | | |
|---|---|---|---|
| Aug. 12, 1997 | [JP] | Japan | 9-217519 |
| Sep. 3, 1997 | [JP] | Japan | 9-238535 |

[51] Int. Cl.[7] .................... B32B 3/10; B32B 1/02
[52] U.S. Cl. .................... 428/34.4; 428/38; 362/363
[58] Field of Search .................... 428/38, 34.4; 52/204.59; 362/363

[56] References Cited

U.S. PATENT DOCUMENTS

| | | | |
|---|---|---|---|
| 642,196 | 1/1900 | Belcher | 428/38 |
| 3,963,233 | 6/1976 | Worden | 428/38 |
| 4,743,477 | 5/1988 | Beaver | 428/38 |

FOREIGN PATENT DOCUMENTS

| | | |
|---|---|---|
| 0220399 | 5/1987 | European Pat. Off. . |
| 3434968 | 4/1986 | Germany . |
| 3533187 | 11/1986 | Germany . |
| WO 92/02378 | 2/1992 | WIPO . |

*Primary Examiner*—Alexander Thomas
*Attorney, Agent, or Firm*—Jordan and Hamburg LLP

[57] ABSTRACT

This invention relates to a stained glass article of a three dimensional shape and a method for producing the same. A glass plate is cut into glass pieces of a certain shape including a pentagon member and a hexagon member. The hexagon member consists of one six-sided irregular member and three four-sided irregular members. The glass pieces of the certain shape are united together via a bonding agent to obtain the three dimensional stained glass imitating the shape of a soccer ball. The glass piece has a curved surface whose radius of curvature is set substantially equal to the radius of the soccer ball.

20 Claims, 8 Drawing Sheets

THREE DIMENSIONAL STAINED GLASS ARTICLE AND METHOD FOR PRODUCING THE SAME

BACKGROUND OF THE INVENTION

1. Field of the Invention

This invention relates to a stained glass article, and more particularly to a three dimensional stained glass article produced by uniting stained glass pieces together, and a method for producing the same.

2. Description of the Background Art

Various stained glass articles are produced by cutting colored glass plates into glass pieces of various shapes and sizes, and by welding the glass pieces to one another via lead frames to joint the glass pieces together. The combination of glass pieces of various colors, shapes and sizes together with the lead frames that distinctively contour the shape of each glass piece exhibits excellent decorativeness.

Some of the stained glass articles are of two dimensional shape produced by merely uniting the glass pieces together via lead frames. They are mainly used in a window, which is generally of a flat shape, because the glass pieces constituting the stained glass article are flat.

Stained glass articles of a three dimensional shape (hereinafter merely referred to as 3D stained glass article) are also popular and used in various fields. In producing such 3D stained glass articles, glass plates are cut into a number of flat glass pieces (two-dimensional polygons including a triangle), and these flat glass pieces are jointed together via lead frames in such a manner that the adjoining glass pieces are bonded at a certain angular position relative to each other to configure a 3D object. Thus, 3D stained glass articles constructed by uniting the two-dimensional polygons together have been produced.

The shape of the above conventional 3D stained glass articles is limited, since the finished product could not shape into a sphere due to the production method of merely jointing the flat glass pieces together. Accordingly, even if trying to imitate the spherical shape of objects existing in the nature or to create spherical objects, the finished products could not satisfy the desired configuration.

There has been proposed another technology of producing a 3D stained glass article by using a great amount of glass pieces of small sizes with an effort to configure the finished product as round as possible. However, this arrangement increases the number of glass pieces used in producing the article, resulting in a cumbersome operation of assembling the glass pieces together.

Further, the above arrangement greatly reduces the ratio of glass component in the finished product, because the adjoining glass pieces need to be jointed via a lead frame, and a great number of lead frames are used in the finished product. Thereby, another problem has occurred that the reduced ratio of glass component mars the beauty inherent to stained glass article, and thus the quality of finished product deteriorates in an aesthetic viewpoint.

Furthermore, in the case where the conventional 3D stained glass article is used as a lamp shade, uniform illumination could not be obtained for the following reasons. The glass pieces constituting the lamp shade are all flat, jointed one another at a certain angular inclination, hence making the outer surface of the finished product discontinuous. Thereby, the intensity of light passing the surface of the stained glass article varies greatly between the adjacent flat surfaces that are united by the discontinuous portion. This results in non-uniform illumination.

SUMMARY OF THE INVENTION

In view of the above drawbacks of the prior art, an object of this invention is to provide a stained glass article that enables formation of a three dimensional structural object having a curved surface, and a method for producing the same.

To accomplish the above object, the present invention is directed to a stained glass article of a three dimensional shape obtained by uniting plural glass pieces together via a bonding agent, at least a portion of the three dimensional shape including one or more glass pieces having a curved surface.

According to this invention, the glass pieces of various shapes obtained by cutting a glass plate are united one by one via the bonding agent to construct the three dimensional stained glass article. Since at least one of the glass pieces has the curved surface (curved glass piece), at least one portion of the three dimensional stained glass article can be configured into the curved surface by using the curved glass piece at a proper position. Thus, the three dimensional stained glass article of this invention has a smooth round surface (without a discontinuous portion) by the use of the curved glass piece, that could not have been attained in a conventional three dimensional stained glass article, for the conventional stained glass article was obtained by assembling flat glass pieces, i.e., two dimensional polygons, resulting in a discontinuous outer surface, i.e., non-spherical shape.

Accordingly, the three dimensional stained glass article of this invention has a more refined shape because of the variation of the outer look including the spherical shape, thereby widening the use range of the article.

This invention is further directed to a method for producing a three dimensional stained glass article with at least one portion thereof configured into a curved surface by cutting a glass plate into glass pieces of a certain shape and by uniting the glass pieces together via a frame member; the method comprising the steps in the order of: setting at least one glass piece in a recess formed on a cast, the curvature of the recess being substantially coinciding with the curved surface of the stained glass article; and heating the glass piece set in the recess of the cast for a predetermined time with a heater of the temperature set substantially equal to a temperature suitable for softening the glass piece to deform a flat surface of the glass piece along the curved surface.

According to this invention, the flat glass piece obtained by cutting the glass plate into the certain shape is placed on the curved recess of the cast, and then heated for the predetermined period with the heater whose temperature has been set to the certain glass softening temperature suitable for deforming the flat surface of the glass piece along a curved surface to obtain a curved glass piece. Thereby, the flat glass piece is shaped into the curved glass piece having the radius of curvature equal to the radius of a certain spherical object. Thus, deformation of the flat glass piece into the curved glass piece can be made easier.

The above and other objects, features and advantages of the present invention will become more apparent upon a reading of the following detailed description and drawings.

DETAILED DESCRIPTION OF THE PREFERRED EMBODIMENTS OF THE INVENTION

Figure 1:
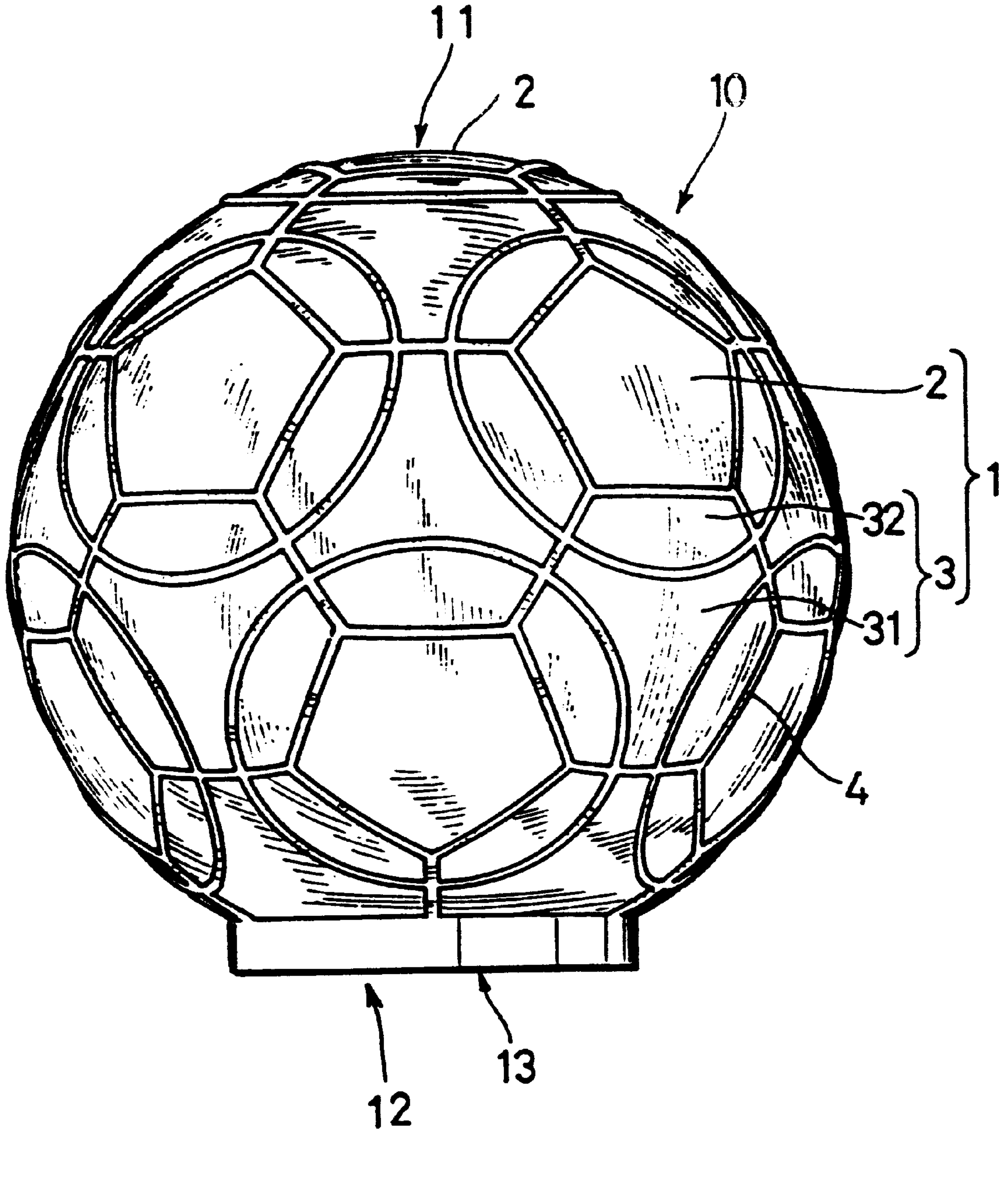
FIG. 1 is a front view of a stained glass article as a first embodiment according to this invention.
Figure 2:
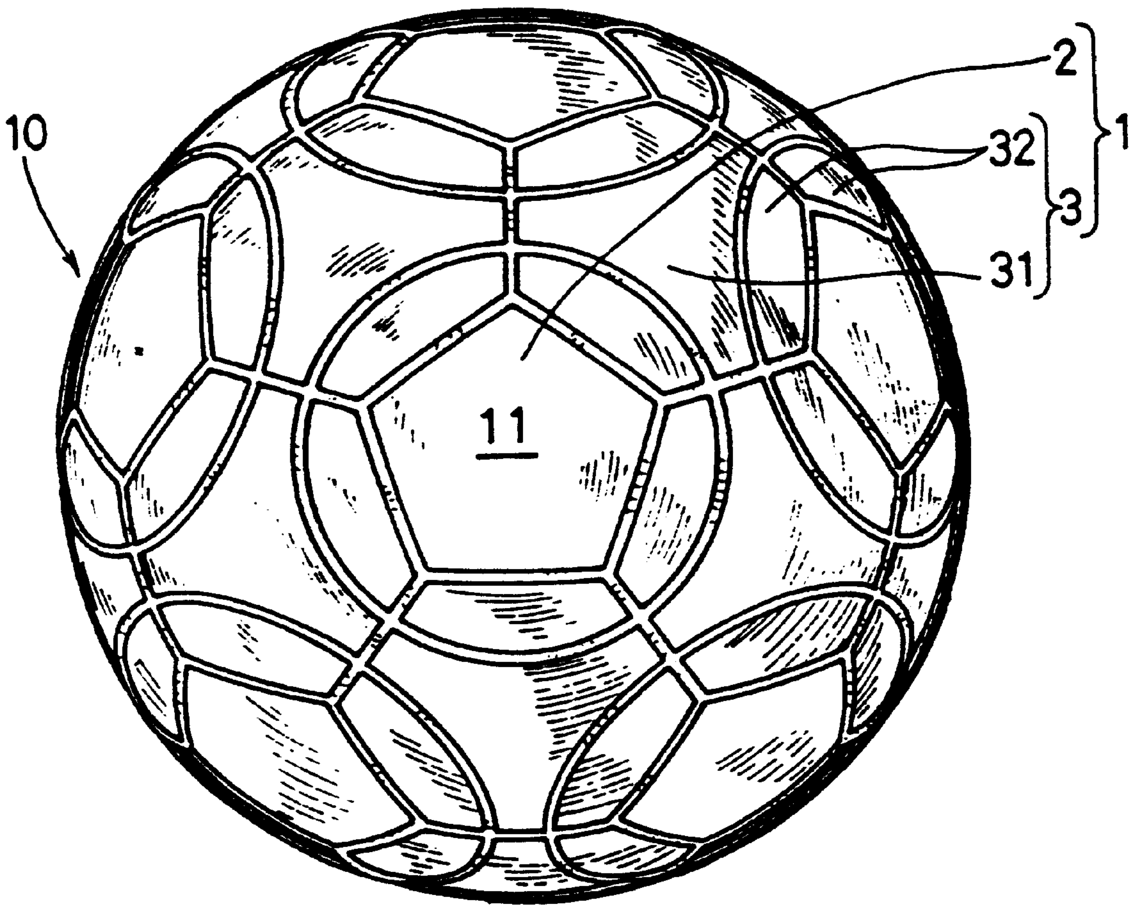
FIG. 2 is a top plan view of the stained glass article of the first embodiment.
Figure 3:
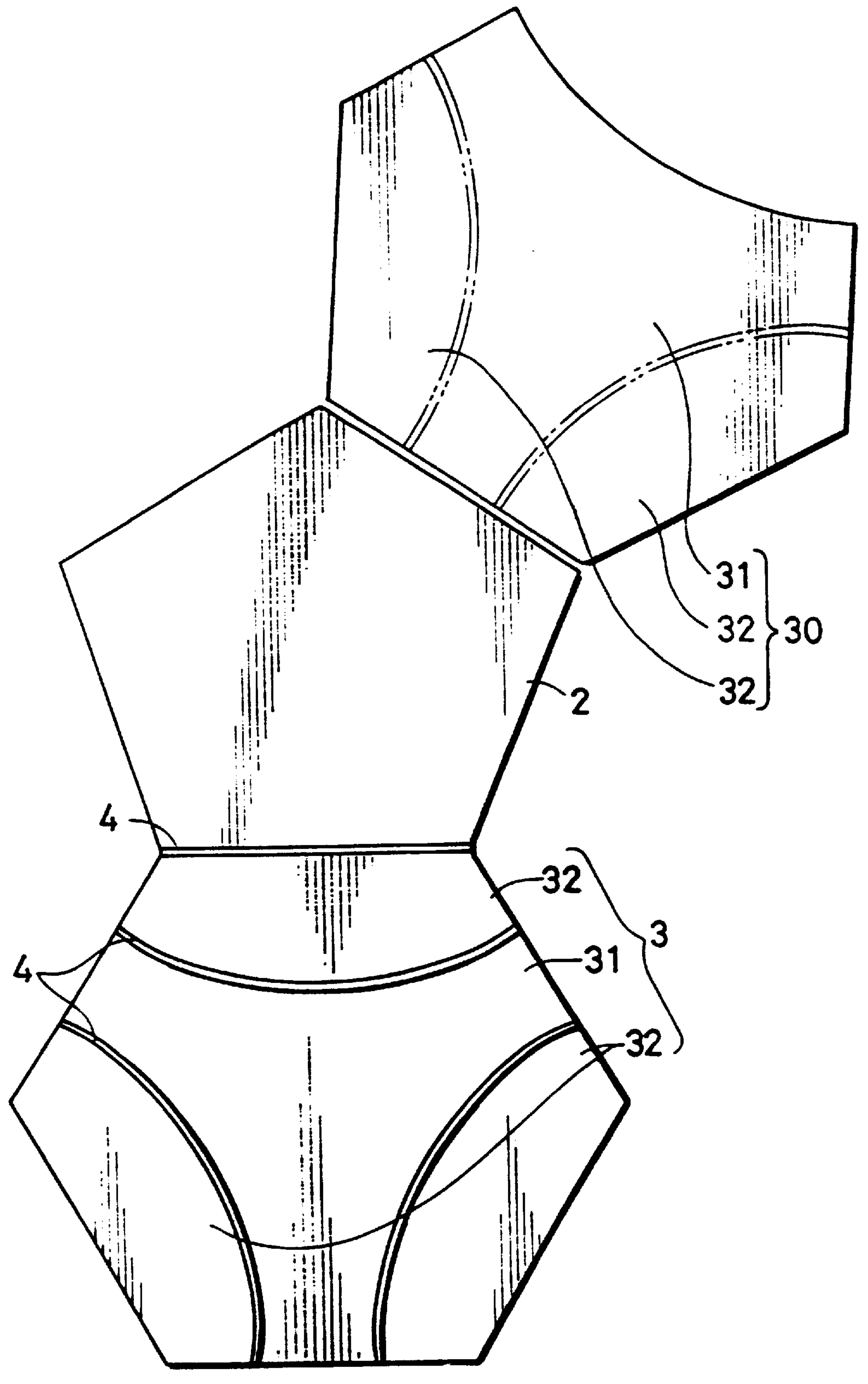
FIG. 3 is a plan view of flat glass pieces constituting the stained glass article, substantially with a full scale.

Hereinafter, a stained glass article according to this invention is described along with the accompanying drawings. FIG. 1 is a front view of the stained glass article as a first embodiment, and FIG. 2 is a top plan view of the stained glass article. FIG. 3 is a plan view showing glass pieces (flat glass pieces) constituting the stained glass article substantially with a full scale. In FIG. 3, each side of the glass piece is straight; it may, however, be formed into a slightly arc shape.

As shown in FIGS. 1 and 2, the three dimensional stained glass article 1 (hereinafter merely referred to as 3D stained glass article) imitates the shape and design pattern of a soccer ball. The 3D stained glass 10 comprises glass pieces 1 having a curved surface (hereinafter merely referred to as "curved glass piece(s)") obtained by cutting a glass plate as a raw material into pieces of a certain shape and size and by deforming the flat surface of the cut glass piece into a curved surface by a method to be described later, and a bonding agent 4 that unites the curved glass pieces 1 together.

The side of the curved glass pieces 1 that is adjacent to each other and opposes to each other is jointed via the bonding agent 4 to produce the 3D stained glass article 10.

In this embodiment, as the curved glass piece 1, there are adopted a regular pentagonal glass piece 2 (hereinafter merely referred to as "pentagon member" and a regular hexagonal glass piece 3 (hereinafter merely referred to as "hexagon member") that is formed by assembling four irregular shaped members according to a certain pattern. The size of one side of the pentagon member 2 is set equal to that of the hexagon member 3.

The 3D stained glass article 10 is produced in the following manner. As shown in FIG. 2, 1) at the top of the stained glass article 10, there is arranged one pentagon member 2.
2) Then, five hexagon members 3 are arranged around the top pentagon member 2 in such a manner that one side of each hexagon member 3 is jointed to one side of the top pentagon member 2 via the bonding agent 4. Also, the sides of the adjacent hexagon members 3 are jointed to each other via the bonding agent 4.
3) Further, five pentagon members 2 and five hexagon members 3 are alternately arranged at the bottom of the five hexagon members 3 that have been united in 2) in such a manner that the opposing sides of the adjacent members are jointed to each other via the bonding agent 4.
4) Again, five pentagon members 2 and five hexagon members 3 are alternately arranged at the bottom of the pentagon members 2 and the hexagon members 3 that have been united in 3) in such a manner that the pentagon member 2 is arranged below the hexagon member 3 in the previous row and the hexagon member 3 is arranged below the pentagon member 2 in the previous row.
5) Finally, five irregular hexagon members 30 (see FIG. 3) are arranged at the bottom of the pentagon members 2 and the hexagon members 3 that have been united in 4) and jointed to each other via the bonding agent 4 in the similar manner such that the opposing sides of the adjacent members are linked via the bonding agent 4.

At a bottom portion 12 of the 3D stained glass article 10, there is defined a hollow portion (insertion hole) by the unification of five irregular hexagon member 30 used in 5). A ring member 13 having the diameter thereof identical to the diameter of the insertion hole is provided at the bottom portion 12. The irregular hexagon member 30 is different from the regular hexagon member 3 in that the former lacks one four-sided irregular shaped member 32, a component of the hexagon member 3, which will be described later in detail, and the area corresponding to the missing four-sided member 32 defines the insertion hole through which a lamp or other lighting equipment can be inserted, when the five irregular hexagon members 30 are united together in 5). In other words, in this embodiment, the bottom portion 12 is formed by uniting five hexagon members 3 each in a state that one four-sided member 32 is missing as shown in FIG. 3.

The regular hexagon member 3 consists of one six-sided irregular shaped member (hereinafter merely referred to as six-sided member) 31 and three four-sided irregular shaped members (hereinafter merely referred to as four-sided member) 32.

The six-sided member 31 has three straight sides and three concave arcs arranged alternately. Each arc of the six-sided member 31 substantially corresponds to one-fifth of the full circumference of a circle formed by uniting one pentagon member 2 and five four-sided members 32 arranged around the pentagon member 2. The four sided member 32 has three straight sides and one convex arc curved as to correspond to the concave arc of the six-sided member 31. The hexagon member 3 is formed by jointing the convex arc portion of the four-sided member 32 and the concave arc portion of the six-sided member 31 via the bonding agent 4.

In this embodiment, a soldering agent made of lead and tin alloy is used as the bonding agent 4. Specifically, the 3D stained glass article 10 is produced by a soldering process of filling, with the melted soldering agent, a clearance between the opposing sides (rims) of the adjacent glass pieces 1 that are being arranged over the outer surface of a spherical base (model) of a predetermined size according to a predetermined pattern.

According to this invention, the pentagon member 2 and the hexagon member 3 (consisting of one six-sided member 31 and three four-sided members 32) are shaped to have the radius of curvature substantially equal to the radius of a soccer ball. Thereby, the 3D stained glass article 10 is configured into a spherical object quite similar to the shape of a soccer ball, thus making the external appearance of the article 10 amusing to look at.

Figure 4:
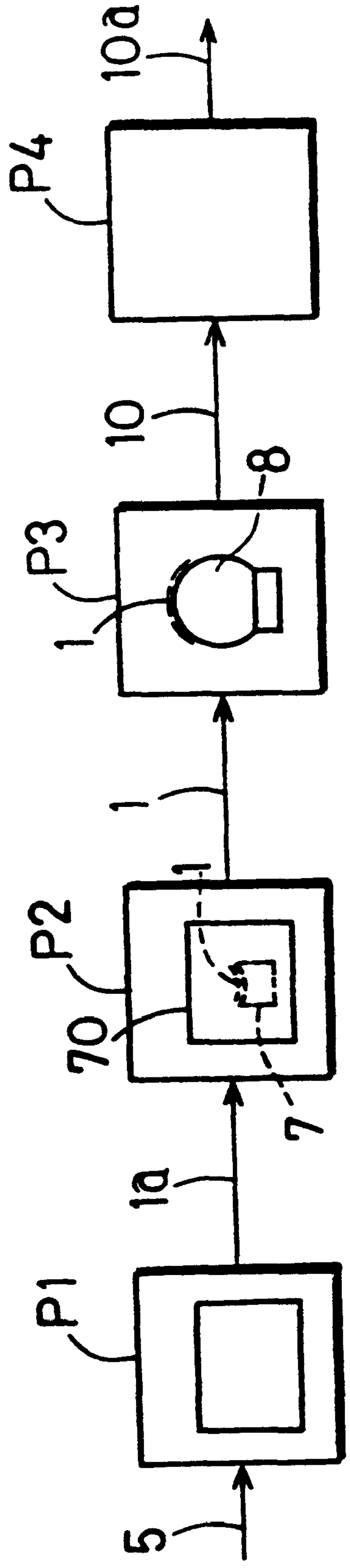
FIG. 4 is a diagram showing steps of producing the stained glass article according to this invention.

Hereinafter, a method for producing the 3D stained glass article 10 is described with reference to FIG. 4. FIG. 4 is a diagram showing steps of producing the 3D stained glass article 10 as one embodiment.

As shown in FIG. 4, the steps according to this embodiment comprises the following steps:

Step P1: cutting a glass plate 5 as a raw material into flat glass pieces la of a certain shape and size (cutting process);

Step P2: shaping (deforming) the flat surface of the flat glass piece 1*a* into a curved surface to obtain a curved glass piece 1 (shaping process);

Step P3: uniting the curved glass pieces 1 together according to a predetermined design or pattern to produce a 3D stained glass article 10 (uniting process); and Step P4: performing a certain finishing treatment on the 3D stained glass article obtained in Step P3 (finish process).

In the cutting process P1, the glass plate 5 is cut into the flat glass piece 1*a* of predetermined dimensions and shape (i.e., the pentagon member 2, the six-sided member 31, and the four-sided member 32). The dimensions of the glass piece 1*a* are calculated in advance to obtain a 3D stained glass article whose size is substantially equal to that of a soccer ball.

In this embodiment, a water jet type cutter 6 is adopted in place of a well-known diamond cutter to cut the glass plate 5. The water jet type cutter 6 is adapted for ejecting water under ultra high pressure through a nozzle onto a principal plane of the glass plate 5. By ejecting the ultra high pressurized water through the nozzle, while moving the nozzle in a desired direction over the principal plane of the glass plate 5, a glass piece 1*a* of a desired shape is cut out from the glass plate 5.

In this embodiment, a control device for numerically controlling the water jet type cutter 6 is employed in controlling driving of the cutter 6. The numerical value representing the configuration (dimensions) of the flat glass piece 1*a* is inputted in the control device in advance to automatically control the movement of the nozzle of the cutter 6 so as to obtain a glass piece 1*a* of a desired shape.

The water jet type cutter 6 is, compared to the well-known diamond cutter device, advantageous in the following point. It is very difficult to non-linearly cut the glass plate with the use of the diamond cutter device to obtain a glass piece of a curved contour. However, the water jet type cutter 6 attains accurate and speedy cutting even when the glass piece of a curved contour is to be cut out.

In addition, it is possible to cut out a smaller piece from the remainder of the glass plate after cutting some pieces, as long as the remainder has an area sufficient for cutting the smaller piece(s). This is effective in utilizing the glass plate as much as possible, and cost regarding the cutting operation and the glass material can be remarkably reduced.

In the shaping process P2, a ceramic cast 7 for deforming the flat surface of the flat glass piece 1*a* into a curved surface, and a furnace (one form of a heater) 70 for uniformly heating the ceramic cast 7 with the glass piece 1*a* set thereon are used. In this embodiment, an electric furnace is used as the heater 70.

Figure 5A:
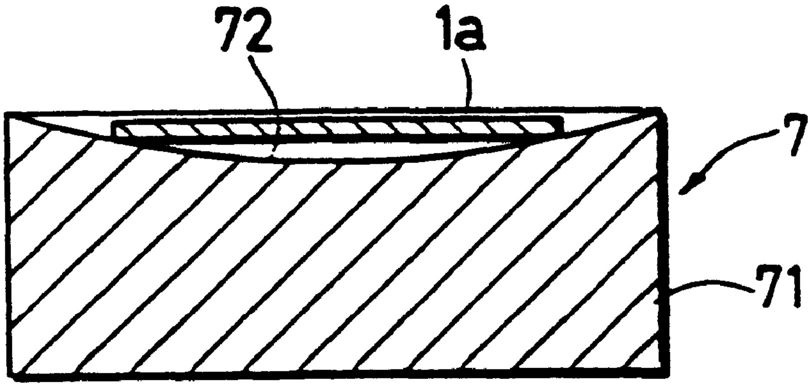
FIG. 5A is a cross sectional view of an embodiment of a ceramic cast with the flat glass piece set thereon.
Figure 5B:
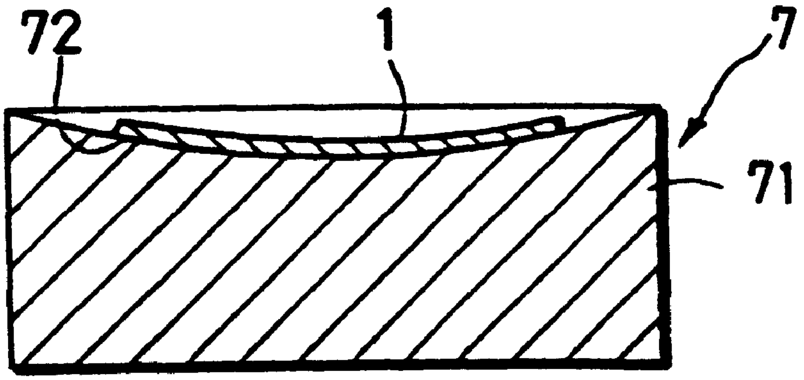
FIG. 5B is a cross sectional view of the ceramic cast showing a state that the flat glass piece set thereon is being deformed into a curved one in a heater.

FIG. 5A is a cross sectional view of an embodiment of the ceramic cast 7 showing a state that the flat glass piece 1*a* has just been set on the ceramic cast 7. FIG. 5B is a diagram showing a state that the flat glass piece 1*a* is being deformed into a curved glass piece 1 on the ceramic cast 7.

The ceramic cast 7 includes a column main body 71 and a recess 72 formed on the top of the main body 71. The radius of curvature of the recess 72 is set substantially equal to the radius of a soccer ball in this embodiment. The ceramic cast 7 is produced according to the following process.

A metallic column member with part of spherical portion (i.e., round portion) formed at the top thereof stands upright. A cylindrical elastic member made of a rubber or its equivalent with an opening at the top and the bottom thereof is covered on the metallic column member from above to form a hollow space defined by the top surface of the round portion of the metallic column member and an inner circumferential wall of the cylindrical elastic member projecting upward from the top round portion.

Then, after layers of synthetic resin sheets are placed one over another on the round portion, a paste-like ceramic member that is a mixture of ceramic powders and a solvent of a certain kind is laid over the resin layer such that the ceramic member fills the space. Then, the paste-like ceramic member overlaid on the top round portion is subjected to dry. After dried to a certain degree, the paste-like ceramic member is removed from the top round portion and subjected to calcination. In this way, the ceramic cast 7 is obtained.

The reasons for using the ceramic cast 7 are to eliminate a thermal deformation that is likely the case with a metallic mold during a heating operation of the mold in the heater 70 and to prevent contamination of glass piece due to melting and adhesion of foreign matters such as carbon particles generated from the metallic mold during the heating operation.

In the shaping step P2, as shown in FIG. 5A, the flat glass piece 1*a* is set on the recess 72 of the ceramic cast 7. Subsequently, the ceramic cast 7 carrying the glass piece 1*a* is loaded in the heater 70. Immediately after the loading of the ceramic cast 7 in the heater 70, a switch for heating the heater 70 is turned on to raise the temperature inside the heater 70 gradually toward a target temperature (glass softening temperature) lower than the melting point of glass.

Then, as shown in FIG. 5B, the flat glass piece 1*a* placed on the recess 72 is softened and deformed by its own weight along a curved glass piece 1 having a curved surface substantially equal to the curvature of the recess 72. At the point when the curved surface of the glass piece 1*a* forms a desired shape, the switch of the heater 70 is turned off, and the inside of the heater 70 is cooled down naturally until the temperature inside the heater 70 substantially lowers to the atmospheric temperature. Thus, the curved glass piece 1 is formed on the recess 72.

Figure 6:
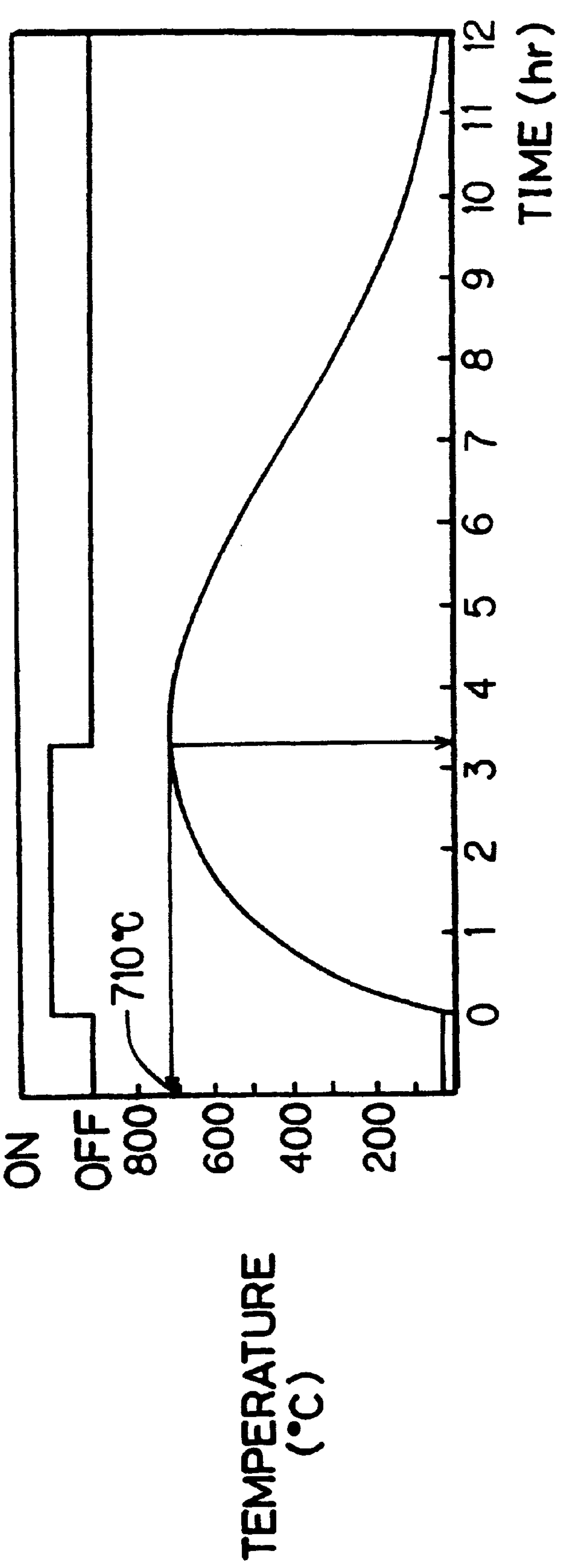
FIG. 6 is a graph showing a change of temperature of the heater versus time.

FIG. 6 is a graph showing the change of temperature inside the heater 70 versus time elapsed. As shown in the graph of FIG. 6, immediately after the ceramic cast 7 with the flat glass piece 1*a* set thereon is loaded in the heater 70, the heater 70 is turned on to initiate rise of temperature inside the heater 70. After 3 to 3.5 hours lapses, the inside temperature of the heater 70 reaches about 710° C., the temperature at which the glass exhibits a desirable softened state. At this point of time, the heater 70 is turned off to lower the inside temperature of the heater 70 to the atmospheric temperature. It takes about 10 hours to lower the inside temperature of the heater 70 substantially equal to the atmospheric temperature. It should be noted that on/off control of the switch for the heater 70 is automated by setting a timer.

More specifically, the following time schedule can be arranged to mass productively obtain curved glass pieces 1 without time loss. That is, a number of ceramic casts 7 each carrying a flat glass piece 1*a* are loaded in the heater 70 in the evening hour for heating. Then, after a certain time necessary for raising the inside temperature of the heater 70 to the target temperature and then lowering to the atmospheric temperature lapses during the night time, the curved glass pieces 1 that have been cooled down to the atmospheric temperature can be immediately taken out from the heater 70 next morning, and an assembling operation can be started promptly.

Figure 7:
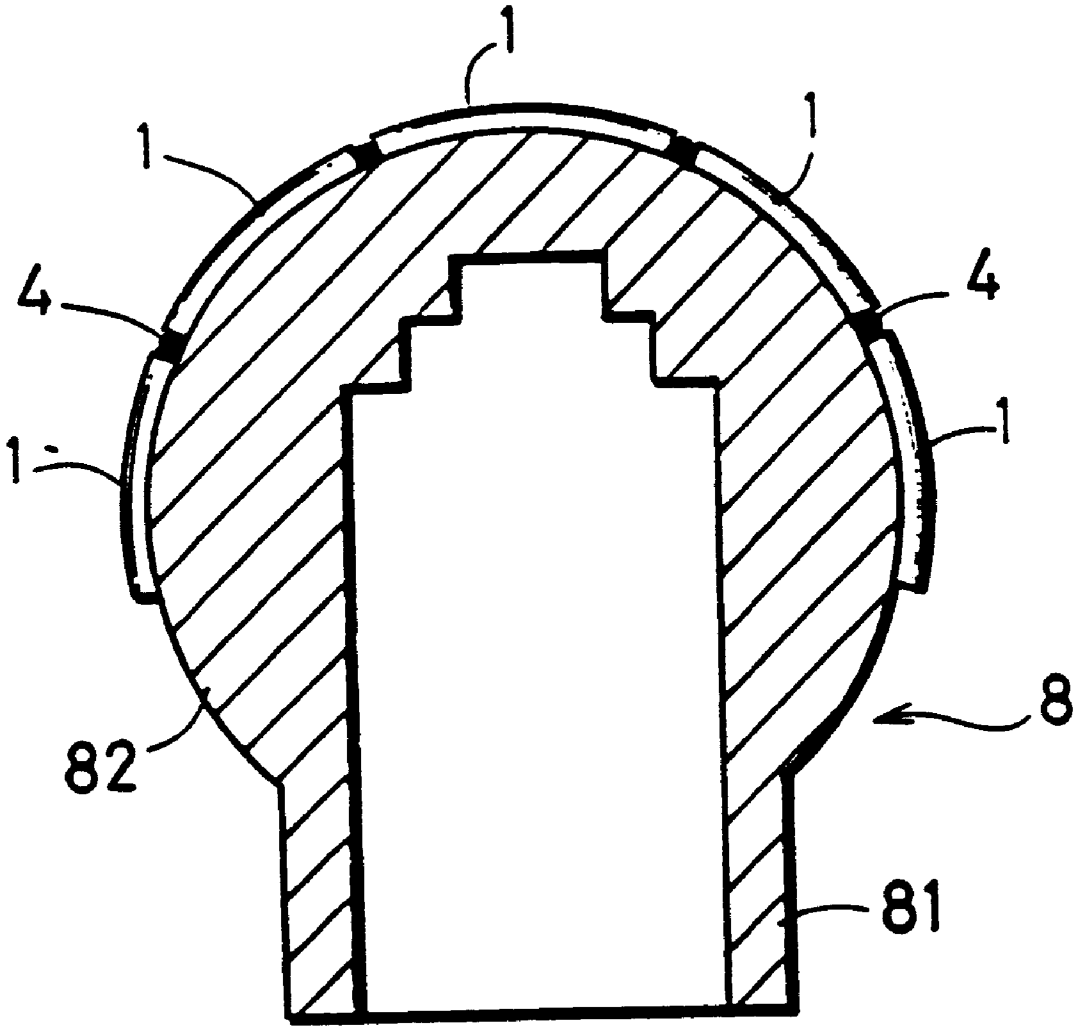
FIG. 7 is a cross sectional view of an embodiment of a model on which the glass pieces are to be united.

In the uniting process P3, a model 8 for uniting the glass pieces 1 is used. FIG. 7 is a cross sectional view of an embodiment of the model 8. The model 8 includes a column base member 81 and a spherical member 82 formed at the top of the base member 81. The spherical member 82 is configured such that the radius of curvature thereof is set substantially equal to the radius of a soccer ball. Thereby, the adjacent curved glass pieces 1 are soldered together in such a manner that the curved surface of each glass piece 1 fittingly covers the outer surface of the spherical member 82 to unite the glass pieces 1 together to produce a 3D stained glass article 10.

The model 8 is produced by machining a hole inside a rod made of soft iron (SS400 according to the Japanese Industrial Standard) from one axial end (bottom) of the rod with the use of a numerically controlled lathe (so-called NC-lathe), and then shaping the upper portion of the rod into at least a spherical shape.

Also in the uniting process P3, the curved glass piece 1 obtained in the shaping process P2 is cleansed with water dissolved with a certain kind of detergent therein, rinsed with water, and then dried. Subsequently, a so-called copper tape in which one side surface thereof is coated with a thin copper film and the opposite side surface is coated with an adhesive agent is taped around the rim of the curved glass piece 1 so that the thin copper film exposes outside. Then, the curved glass piece 1 with the copper tape covering the rim thereof is pressingly set on the spherical member 82 of the model 8 one by one with a clearance of about 1 mm formed between the adjacent curved glass pieces 1, while the adjacent curved glass pieces 1 being temporarily linked to each other at one portion or more via an adhesion tape.

Subsequently, a temporary linking of the adjacent glass pieces 1 is performed by soldering operation of dripping a small amount of melted soldering agent in the 1 mm clearance with the use of a solder. Subsequently, the adhesion tape is removed, and the remaining clearance between the linked adjacent glass pieces 1 is filled with the soldering agent (main soldering). Thereby, the adjacent curved glass pieces 1 are united together by the bonding agent 4 which is the soldering agent.

The above step of taping, temporary adhesion (linking), and main soldering are repeated to form an upper half portion of the 3D stained glass article 10 on the spherical member 82. When the upper half portion of the 3D stained glass article 10 is thus formed on the spherical member 82, the half-way assembled 3D stained glass article 10 is removed from the model 8.

Then, the upper half portion of the 3D stained glass article 10 is turned upside down. This time, the remaining lower half portion is produced by uniting the glass pieces 1 one by one in such a manner that the clearance between the adjacent glass pieces 1 is filled with the soldering agent.

It should be noted that the assembling operation of the lower half portion of the 3D stained glass article 10 can be carried out without the use of the model 8, since the upper half portion has already been completed. Further, since each glass piece is cut out by the numerically controlled water jet cutter device and thus has precise dimensions, there can be eliminated a drawback that the adjacent glass pieces do not fit each other in the uniting process.

Next, in the finish process P4, the surface of the 3D stained glass article 10 is copper-plated by coating a solution of copper sulfate on the surface of the bonding agent 4 that unites the adjacent glass pieces 1. Thereby, the copper-plated portion exhibits antique color tone to make the external appearance of the 3D stained glass article 10 as a whole look antique. Finally, the stained glass article 10 is cleansed with a detergent mixed with water (and then rinsed with water) to obtain a finished stained glass article 10*a* (finished product).

The finished product 10*a* has an external appearance similar to that of a soccer ball. In other words, the curved glass pieces 1 (i.e., pentagon member 2, and hexagon member 3 consisting of one six-sided member 31 and three four-sided members 32) all have the radius of curvature substantially equal to the radius of a soccer ball.

Accordingly, the product obtained by uniting the curved glass pieces 1 together has a spherical shape which is exactly the same as the shape of a soccer ball, that could not have been attained by a stained glass article of prior art produced by assembling flat glass pieces. Thus, the finished product obtained by uniting the curved glass pieces 1 together results in the spherical object, that is amusing to look at.

The 3D stained glass article 10 can be used as an interior decoration and also can be utilized as a lamp shade by installing a lamp or other lighting equipment inside the stained glass article 10 through the insertion hole of the ring member 13 provided at the bottom portion 12.

Figure 8:
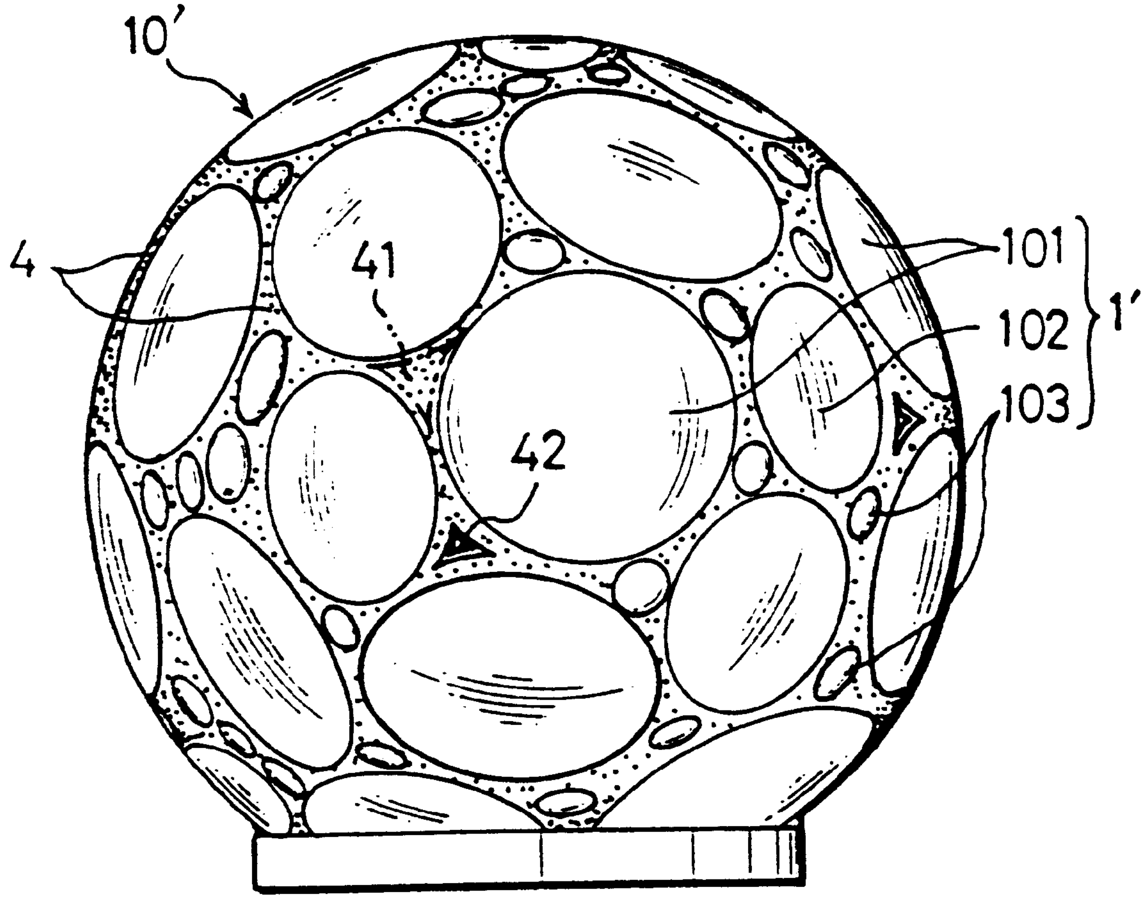
FIG. 8 is a front view of a stained glass article as a second embodiment according to this invention.

FIG. 8 is a front view of a second embodiment of a stained glass article according to this invention. In the second embodiment, a glass piece 1' of a circular shape in plan view (circular glass piece) is used as a glass piece constituting the stained glass article. More specifically, the circular glass piece 1' includes a large circular member 101, a medium circular member 102, and a small circular member 103. The radius of the small circular member 103 is smaller than that of the medium circular member 102, which is slightly smaller than that of the large circular member 101.

These circular members 101 to 103 are arranged in a well proportional manner and linked to each other in a state that a circumferential portion of the adjacent circular members 101 to 103 opposes to each other with a certain clearance to make the outer look of a finished product more attractive. Thus, a 3D stained glass article 10' of a spherical shape is produced.

The soldering agent used in the first embodiment is also used as the bonding agent 4 (shown by the dots in FIG. 8) for linking the circular members 101, 102, and 103 in the second embodiment. A space defined by three adjacent large/medium sized circular members when being assembled together, i.e., a space defined by one large circular member 101 and two medium circular members 102, or two large circular members 101 and one medium circular member 102 has an irregular triangular shape of a relatively large area, because the radius of these members is large. Accordingly, it is difficult to fill the large irregular triangular space with the soldering agent by the ordinary soldering. To avoid such a difficulty, a supplementary member 41 of an irregular triangular shape with three concave arcs, as shown by the chain line with two dots in FIG. 8, is produced in advance with the same material as used in the bonding agent 4. The supplementary member 41 is fitted in the irregular triangular space to make the soldering operation that follows easier.

Alternatively, the irregular triangular shaped space may not be covered with the supplementary member, and may be left as it is. Thereby, a triangular through hole 42 is formed in an area corresponding to the space where no soldering agent is used, which makes a one-point design on the stained glass article 10'.

According to this embodiment, the shape of the 3D stained glass article 10' is spherical with the circular members 101 to 103 of different sizes of the same color or of different colors attached to the outer surface of the spherical object at randomly, which makes the appearance of the article 10' attractive in the aspect of design.

In particular, in the case where the 3D stained glass article 10' is used as a lamp shade, the light from the light source of a lamp passes the circular members 101 to 103 arranged on the spherical surface to illuminate the surrounding uniformly, while partially allowing a beam of light to leak through the triangular through hole 42. The combination of strong beam of light and uniform illumination makes the lighting pattern variable and amusing to look at.

In the second embodiment, the circular glass pieces are used. However, the shape of the glass piece is not limited to the above, and may be elliptic, or polygon including a triangle. Further, the entire configuration of the 3D stained glass article may be oval in place of a sphere, or one portion of the article may be shaped into part of a sphere.

In the foregoing embodiments, the adjacent glass pieces are linked by line-to-line connection. Alternatively, the linking of adjacent glass pieces may be point-to-point connection such that an apex of one polygonal glass piece comes into contact with part of a circumference of the other glass piece, e.g., of a circular shape.

It is to be noted that this invention may take the following modifications and alterations.

(1) In the above embodiments, the 3D stained glass article 10 imitates the shape of a soccer ball, but may imitate the shape of a volleyball, basketball, golf ball, rugby ball and other spherical object. Further, the shape of the article 10 is not limited to the spherical one. The article 10 may be of any three dimensional shape, as long as one portion thereof has a curved surface.

(2) In the foregoing embodiments, the adjacent curved glass pieces 1 are jointed to each other by soldering. In place of soldering, an H-shaped joint member that has an H-shape in cross section and is made of lead may be used such that a rim of one glass piece 1 is fitted in a recess of one wing of the H-shaped joint member, while a rim of another glass piece 1 is fitted in a recess of the opposite wing of the H-shaped joint member, thereby linking the curved glass pieces 1 together.

(3) In the aforementioned embodiments, after the ceramic cast 7 with the flat glass piece **1*a* set thereon is loaded in the heater 70, the heater 70 is turned on in the shaping process P2. In place of this order, the heater 70 may be turned on prior to the loading of the ceramic cast 7 to raise the inside temperature of the heater 70. Then, the ceramic cast 7 with the flat glass piece 1*a* set thereon may be loaded in the heater 70 that has already attained a desirable high temperature. Thereby, the process time necessary for the shaping process P2** may be shortened.

(4) In the foregoing embodiments, the highest temperature in the heater 70 is set at 710° C. However, the target temperature inside the heater 70 is not limited to the above, and may be set at a value in the range of 650 to 800° C. according to the kind of glass material composing the glass plate 5. If the target temperature is less than 650° C., some of the glass pieces may not exhibit a desirable softness sufficient to form a curved surface depending on the kind of glass material. Hence, it becomes impossible to obtain a curved glass piece. On the contrary, if the target temperature exceeds 800° C., some of the glass pieces are melted. To avoid such drawbacks, the target temperature inside the heater 70 is set within the range of 650 to 800° C. to enable adjustment to a desired softening temperature according to glass materials of different kinds.

(5) In the shaping process P2, heated air may be uniformly blown onto the flat glass piece **1*a* set on the ceramic cast 7 to deform the flat surface of the glass piece la along a curved surface to obtain a curved glass piece 1. Heated air alone may be used in the shaping process P2 to cause a thermal deformation of the glass piece, or may be used in combination with the heating operation by the heater 70** to accelerate the thermal deformation.

As an alteration, a heater may be directly embedded in the ceramic cast main body 71 to heat the main body 71 directly by the heat of the heater.

(6) Various modifications of a spherical stained glass article can be produced by changing the combination patterns of pentagon members and hexagon members. Principal combinations are shown in Table 1.

TABLE 1

(Unit: piece)

| shape | plan view | basic type | type A | type B | type C | type D | type E | type F |
|---|---|---|---|---|---|---|---|---|
| I |  | 12 | 12 | 12 | 11 | 11 | 10 | 11 |
| II |  | 20 | 19 | 18 | 15 | — | 10 | 20 |
| III |  | — | — | — | — | 20 | — | — |
| IV |  | — | — | — | 5 | — | 10 | — |
| V |  | — | — | — | — | 55 | — | — |
| | Finished shape | B1 | M1 | M2 | M3 | | M4 | M5 |

Note:
I . . . pentagon piece
II . . . hexagon piece
III . . . six-sided irregular shaped piece
IV . . . six-sided irregular shaped piece with one four-sided irregular shaped piece missing
V . . . four-sided irregular shaped piece
B1 . . . sphere with no hole
M1 . . . sphere with a hexagon hole on the top or bottom thereof
M2 . . . sphere with a hexagon hole on the top and bottom thereof
M3 . . . sphere with a circular hole on the top or bottom thereof
M4 . . . sphere with a circular hole on the top and bottom thereof
M5 . . . sphere with a pentagon hole on the top or bottom thereof This invention is not limited to the combinations shown in Table 1. Other combinations may be adopted as long as uniting the glass pieces according to such combination can produce a spherical object. Further, the shape of the hole for inserting a lamp or other lighting equipment is not limited to the above, and may take other forms.

Next, an example of producing a 3D stained glass article 10 whose dimensions are set substantially equal to those of a soccer ball is described. First, the length of one side of the pentagon member 2 and the hexagon member 3 was calculated based on a soccer ball officially used in a professional soccer ball game. The official soccer ball has the length of circumference ranging from 680 to 700 mm.

Hereinafter, the unit for the surface area is in $mm^2$.

The surface area $S_{680}$ of a sphere whose circumferential length is 680 mm is:

$$S_{680}=4\times\pi\times(680/2\pi)^2=147261.1\ \text{mm}^2$$

The surface area $S_{700}$ of a sphere whose circumferential length is 700 mm is:

$$S_{700}=4\times\pi\times(700/2\pi)^2=156051.0\ \text{mm}^2$$

Accordingly, the surface area S of the official soccer ball, i.e., whose circumferential length ranges from 680 to 700 mm should satisfy the following mathematical expression:

$$147261.1\leqq S\leqq 156051.0\ \text{mm}^2 \qquad ①$$

On the other hand, the length of one side of the pentagon member 2 and the hexagon member 3 is identical to each other and indicated by L. A spherical object (i.e., 3D stained glass article of this invention) close to a complete sphere is produced by uniting twelve pentagon members 2 and twenty hexagon members 3 together.

The surface area S' of the spherical object obtained by the above unification was calculated based on the surface area $S_5$ of one pentagon member 2 and the surface area $S_6$ of one hexagon member 3 as follows:

First, the surface areas S5 and S6 were calculated:

$$S_5=((5\times L^2)/(4\times\tan 36^\circ))\text{mm}^2$$

$$S_6=((3\times L^2)/(2\times\tan 30^\circ))\text{mm}^2$$

Accordingly, the surface area S' of the spherical object is:

$$S'=12S_5+20S_6=12((5\times L^2)/(4\times\tan 36^\circ))+20((3\times L^2)/(2\times\tan 30^\circ))=72.6072\times L^2\ \text{mm}^2 \qquad ②$$

Assuming that the surface area S of the sphere (i.e., official soccer ball in this example) and the surface area S' of the spherical object of the present invention is approximately the same (S=S'), substituting the expression ② into the expression ① as follows:

$$147261.1\leqq 72.6072\times L^2\leqq 156051.0\ \text{mm}^2$$

Dividing by 72.6072 and taking a square root, the following expression is obtained:

$$45.0\ \text{mm}\leqq L\leqq 46.4\ \text{mm} \qquad ③$$

Based on the above expression ③, the length L of one side of the pentagon member 2 and hexagon member 3 can be set within the range from 45.0 mm to 46.4 mm.

In this example, the length L was set at 46 mm. Accordingly, the radius of a spherical object to be produced by uniting the curved glass pieces 1 was set at 111 mm. Thus, the radius of curvature of the curved glass piece 1 (i.e., pentagon member 2 and hexagon member 3) was set at 111 mm, and the curvature of the recess 72 of the ceramic cast 7 was determined based on the above value of radius of curvature.

The actual length of one side of the pentagon member 2 and the hexagon member 3 was set at 45 mm in this example, considering the condition that the bonding agent 4 is to fill the clearance between the adjoining curved glass pieces 1, i.e., 1 mm (46 mm−45 mm) clearance is to be prepared for soldering.

The 3D stained glass article 10 produced by assembling the glass pieces of exact dimensions calculated based on the above formulations has a spherical shape substantially identical to a soccer ball. Further, arranging different colored glass pieces according to the design pattern of a soccer ball enhances the utilization of the 3D stained glass article as an interior decoration or a lamp shade.

Summing up the invention, the present invention is directed to a stained glass article of a three dimensional shape obtained by uniting plural glass pieces together via a bonding agent, at least a portion of the three dimensional shape including one or more glass pieces having a curved surface.

With this arrangement, the glass pieces of various shapes obtained by cutting a glass plate are united one by one via the bonding agent to construct the three dimensional stained glass article. Since at least one of the glass pieces has the curved surface (curved glass piece), at least one portion of the three dimensional stained glass article can be configured into the curved surface by using the curved glass piece at a proper position. Thus, the three dimensional stained glass article of this invention has a smooth round surface (without a discontinuous portion) by the use of the curved glass piece, that could not have been attained in a conventional three dimensional stained glass article, for the conventional stained glass article was obtained by assembling flat glass pieces, i.e., two dimensional polygons, resulting in a discontinuous outer surface, i.e., non-spherical shape.

Accordingly, the three dimensional stained glass article of this invention has a more refined shape because of the variation of the outer look including the spherical shape, thereby widening the use range of the article.

Preferably, the three dimensional shape of the stained glass article may be a spherical shape.

With this arrangement, the three dimensional stained glass article can imitate the shape of various spherical objects such as soccer ball, volleyball, basketball, golf ball, and rugby ball (American football). Thereby, while solving the drawback of the prior art in which a spherical stained glass article could not be produced, the three dimensional stained glass of this invention can be shaped into a variety of spherical shape.

Preferably, the glass piece may have a triangular shape in plan view or may have a shape of combination of triangles in plan view.

With this arrangement, for example, an equilateral triangular glass piece in plan view is used such that the radius of curvature thereof is set equal to the radius of a certain spherical object. Then, a spherical object (3D object) similar to a regular icosahedron can be configured by uniting twenty equilateral triangular glass pieces. Further, for instance, a regular pentagon member in plan view is formed by combining five isosceles triangular glass pieces, and a spherical object (3D object) similar to a regular dodecahedron can be configured by uniting twelve regular pentagons each consisting of five isosceles triangles.

In this way, the flat glass plate as a raw material is cut into glass pieces of equilateral triangle or isosceles triangle, and these glass pieces of the certain triangular shape are heated to deform the flat surface thereof into the curved surface whose radius of curvature is set substantially equal to the radius of the certain spherical object. Then, these curved glass pieces are combined with one another according to a certain pattern to configure a spherical stained glass article with ease.

More preferably, one group of the glass pieces may have a shape of regular pentagon and another group of the glass pieces may have a shape of regular hexagon, each in plan view with the radius of curvature thereof substantially set equal to the radius of the spherical object, and the dimensions of the regular pentagon and the dimensions of the regular hexagon may be set such that twelve regular pentagons and twenty regular hexagons form the spherical object when being united together.

With this arrangement, the spherical stained glass article has an appearance similar to the shape and design pattern of a soccer ball.

More preferably, the regular hexagon may include a four-sided irregular shaped member in plan view consisting of one convex arc and three straight sides, and a six-sided irregular shaped member in plan view consisting of three concave arcs and three straight sides, whereby the regular hexagon is formed when the six-sided member and the four-sided member are assembled together in a state that the concave arc of the six-sided member is fittingly jointed to the convex arc of the four-sided member via the bonding agent.

With this arrangement, the regular hexagon is made by uniting the glass pieces of the size smaller than a regular hexagonal glass piece. Accordingly, the spherical stained glass article has a fine and smooth shape because the sphere consists of a greater number of smaller glass pieces, resulting in more sophisticated shape and design of the stained glass article.

This invention is further directed to a method for producing a three dimensional stained glass article with at least one portion thereof configured into a curved surface by cutting a glass plate into glass pieces of a certain shape and by uniting the glass pieces together via a frame member; the method comprising the steps in the order of: setting at least one glass piece in a recess formed on a cast, the curvature of the recess being substantially coinciding with the curved surface of the stained glass article; and heating the glass piece set in the recess of the cast for a predetermined time with a heater of the temperature set substantially equal to a temperature suitable for softening the glass piece to deform a flat surface of the glass piece along the curved surface.

According to this invention, the flat glass piece obtained by cutting the glass plate into the certain shape is placed on the curved recess of the cast, and then heated for the predetermined period with the heater whose temperature has been set to the certain glass softening temperature suitable for deforming the flat surface of the glass piece along a curved surface to obtain a curved glass piece. Thereby, the flat glass piece is shaped into the curved glass piece having the radius of curvature equal to the radius of a certain spherical object. Thus, deformation of the flat glass piece into the curved glass piece can be made easier.

Further, according to the stained glass article producing method of this invention, the cast may preferably be made of a ceramic material.

Thereby, it becomes possible to mold a cast with a recess having a desired curvature with the use of ceramic powders to easily manufacture a desired spherical shaped stained glass article.

Further, the cast composed of the ceramic material is advantageous in that it can eliminate a thermal deformation of the cast itself or contamination of glass piece due to intrusion of foreign matters such as carbon particles that would have occurred in the conventional cast made of metallic material such as iron. Thus, the glass pieces of a fine curved surface without contamination can be assuredly obtained.

Although the present invention has been fully described by way of example with reference to the accompanying drawings, it is to be understood that various changes and modifications will be apparent to those skilled in the art. Therefore, unless otherwise such change and modifications depart from the scope of the invention, they should be construed as being included therein.

What is claimed is:

1. A stained glass article of a three dimensional shape obtained by uniting plural glass pieces together via a bonding agent, the three dimensional shape including an enclosed interior, at least a portion of the three dimensional shape including one or more glass pieces having a curved surface.

2. The stained glass article according to claim 1, wherein the three dimensional shape is a sphere.

3. The stained glass article according to claim 1 or 2, wherein the glass pieces have a triangular shape in plan view or has a shape of combination of triangles in plan view.

4. The stained glass article according to claim 1 wherein the glass shaped article has a single enclosed volumetric space.

5. The stained glass article according to claim 4 wherein the three dimensional shape has dimensions corresponding substantially to that of a soccer ball.

6. The stained glass article according to claim 1 wherein the three dimensional shape has a configuration in the form of a ball selected from the group consisting of a soccer ball, volleyball, basketball, golf ball and rugby ball.

7. A stained glass article having the configuration of a soccer ball comprising a plurality of glass pieces having an outer curved surface corresponding to the configuration of a part of the exterior surface of a rugby ball, a bonding agent bonding said plurality of glass pieces together to form a three dimensional article having an enclosed interior and an exterior curved surface corresponding to the curved exterior surface of a rugby ball.

8. A stained glass article in the shape of a sphere obtained by uniting plural glass pieces together via a bonding agent, at least a portion of the sphere including one or more glass pieces having a curved surface, one group of the glass pieces having a shape of a regular pentagon and another group of the glass pieces having a shaped of a regular hexagon, each group of glass pieces in plan view having a radius of curvature substantially equal to the radius of the sphere, and the dimensions of the regular pentagon and the dimensions of the regular hexagon are set such that twelve regular pentagons and twenty regular hexagons form the sphere when united together.

9. The stained glass article according to claim 8, wherein the regular hexagon includes a four-sided irregular shaped member in plan view consisting of one convex arc and three straight sides, and a six-sided irregular shaped member in plan view consisting of three concave arcs and three straight sides, whereby the regular hexagon is formed when the six-sided member and the four-sided member are assembled together in a state that the concave arc of the six-sided member is fittingly jointed to the convex arc of the four-sided member via the bonding agent.

10. A stained glass article having an enclosure portion defining an interior and an aperture opening up into said interior, said enclosure portion comprising a plurality of individual glass pieces, and a bonding agent uniting said plurality of individual glass pieces, at least a section of the enclosure portion including one or more individual glass pieces having a curved surface.

11. The stained glass article according to claim 10, said enclosure portion is a spherical portion extending over a spherical area greater than a hemisphere.

12. The stained glass article according to claim 11 wherein one group of the glass pieces have a shape of a regular hexagon, said one group of glass pieces in plan view having a radius of curvature substantially equal to the radius of the spherical portion.

13. The stained glass article according to claim 12, wherein the dimensions of the regular hexagon are set such that fifteen regular hexagons form fifteen different parts of the spherical portion.

14. The stained glass article according to claim 12, wherein the regular hexagon includes a four-sided irregular shaped member in plan view consisting of one convex arc and three straight sides, and a six-sided irregular shaped member in plan view consisting of three concave arcs and three straight sides, whereby the regular hexagon is formed when the six-sided member and the four-sided member are assembled together in a state that the concave arc of the six-sided member is fittingly jointed to the convex arc of the four-sided member via the bonding agent.

15. The stained glass article according to claim 11, wherein one group of the glass pieces has a shape of a regular pentagon, said one group of glass pieces having a radius of curvature substantially equal to the radius of the spherical portion.

16. The stained glass article according to claim 15 wherein the dimensions of the regular pentagon are set such that eleven regular pentagons form eleven different parts of the spherical portion when being united.

17. The stained glass article according to claim 10 wherein the aperture has a configuration selected from the group consisting of a circle, a pentagon and a hexagon.

18. The stained glass article according to claim 10 comprising a cylindrical ring disposed at said aperture.

19. The stained glass article according to claim 10 wherein the enclosure portion has two apertures opening up into the interior.

20. A stained glass article having a spherical portion obtained by uniting a plurality of individual glass pieces together via a bonding agent, at least a section of the spherical portion including one or more individual glass pieces having a spherical exterior surface and a spherical interior surface, said spherical portion being greater than a hemisphere.

* * * * *